(12) United States Patent
Dugan et al.

(10) Patent No.: US 8,651,052 B1
(45) Date of Patent: Feb. 18, 2014

(54) POWDERED BRAN FEEDER

(71) Applicants: Troy L. Dugan, Quinton, OK (US);
Rowdy Givens, McAlester, OK (US)

(72) Inventors: Troy L. Dugan, Quinton, OK (US);
Rowdy Givens, McAlester, OK (US)

( * ) Notice: Subject to any disclaimer, the term of this patent is extended or adjusted under 35 U.S.C. 154(b) by 0 days.

(21) Appl. No.: 13/625,321

(22) Filed: Sep. 24, 2012

(51) Int. Cl.
*A01K 5/02* (2006.01)

(52) U.S. Cl.
USPC ............ 119/51.11; 119/51.15; 119/57.1; 119/57.91

(58) Field of Classification Search
USPC ........ 119/51.11, 52.1, 51.01, 53, 51.02, 56.1, 119/51.14, 51.15, 51.91, 51.92, 57.1
See application file for complete search history.

(56) References Cited

U.S. PATENT DOCUMENTS

| | | | |
|---|---|---|---|
| 4,556,090 A | 12/1985 | Pujari | |
| 4,582,263 A | 4/1986 | Delwel | |
| 4,719,875 A | 1/1988 | Van Gilst | |
| 4,841,912 A | 6/1989 | Oswald | |
| 4,986,220 A | 1/1991 | Reneau et al. | |
| 5,069,164 A | 12/1991 | Wiwi | |
| 5,143,289 A | 9/1992 | Gresham et al. | |
| 5,794,561 A | 8/1998 | Schulz | |
| 5,833,361 A | 11/1998 | Funk | |
| 6,988,465 B2 | 1/2006 | Park | |

*Primary Examiner* — T. Nguyen
(74) *Attorney, Agent, or Firm* — Molly D. McKay

(57) ABSTRACT

The present invention provides a game feeder that successfully dispenses powdered forms of grain such as rice bran. The invention adds a semi-flexible cable that attaches by one end to the center of a spinning member of an existing feeder's dispensing mechanism. The cable extends upward through the center of the feed hopper so that the opposite end of the cable is located within a hollow center of the feed made within the feed hopper as the feed is loaded into the feed hopper. The flexible member preferably has a weight attached at its terminal end so that the cable and weight are swung around within the feed hopper as the spinning member rotates providing enough stirring action to the feed to cause it to move downward within the hopper, through the bottom opening of the hopper and to the automated feed dispersing mechanism.

1 Claim, 2 Drawing Sheets

POWDERED BRAN FEEDER

CROSS-REFERENCE TO RELATED APPLICATIONS

The present application claims priority to Provisional Patent Application Ser. No. 61/540,095 for Powdered Bran Feeder that was filed on Sep. 28, 2011.

BACKGROUND OF THE INVENTION

1. Field of the Invention

The present invention is an improvement on existing game feeders. The improvement of the present invention allows the modified feeders to dispense powdered forms of feed such as rice bran which would normally cake up and not be fed properly from existing game feeders.

2. Description of the Related Art

Existing game feeders generally are provided with gravity feed hopper for holding the feed and a mechanism at the bottom of the hopper for periodically dispersing feed from the hopper. Typical game feeders are taught in U.S. Pat. No. 4,986,220 by inventors Reneau et al. and also in U.S. Pat. No. 5,143,289 by inventors Gresham et al. Each of these game feeders has a feed hopper that holds feed. Each has a hopper that is in the shape of an inverted cone at the bottom so that the feed gravity feeds downward to a bottom opening underneath which is an automated feed dispersing mechanism. Each has a feed dispersing mechanism is provided with a spinning or rotating member that spins or rotates to disperse feed from the feeder and prevents the feed from being dispensed when the member is not spinning or rotating.

Although these types of game feeders work well with feeds that are grains such as corn, they are not suitable for use with powdered feeds such as rice bran because the powdered feeds tend to accumulate moisture and cake up so that they do not feed properly from the feed hopper.

The present invention addresses this problem by providing a semi-flexible cable, such as a metal cable, that attaches by a first proximal end of the cable to the center of the spinning member of an existing feeder and extends upward through the center of the feed hopper so that the opposite terminal end of the cable is located within a hollow center of the feed made within the feed hopper as the feed is loaded into the feed hopper. The flexible member preferably has a weight attached at its terminal end so that as the spinning member rotates, the cable and weight are swung around within the feed hopper to provide enough stirring action to the feed to cause it to move downward within the hopper, through the bottom opening of the hopper and to the automated feed dispersing mechanism.

SUMMARY OF THE INVENTION

Existing game feeders generally are provided with a bottom opening, gravity feed hopper for holding the feed and a mechanism associated with the bottom opening for periodically dispersing feed from the hopper. The hoppers or inserts provided within the hoppers may be in the shape of an inverted cone at the bottom so that the feed located within the hoppers will gravity feed downward to the bottom opening, through the bottom opening and onto an automated feed dispersing mechanism that is located under the bottom opening. The feed dispersing mechanism is provided with a spinning or rotating member that spins or rotates to disperse feed from the feeder and prevents the feed from being dispensed when the member is not spinning or rotating.

Although these types of game feeders work well with feeds that are grains such as corn, they are not suitable for use with powdered feeds such as rice bran because the powdered feeds tend to accumulate moisture and cake up so that they do not feed properly from the feed hopper.

Referring now to the drawings, the present invention addresses this problem by providing a semi-flexible cable, such as a metal cable, that attaches by a first proximal end of the cable to the center of the spinning member of an existing feeder and extends upward through the center of the feed hopper so that the opposite terminal end of the cable is located within a hollow center of the feed made within the feed hopper as the feed is loaded into the feed hopper. The flexible cable preferably has a weight attached at its terminal end so that as the spinning member rotates, the cable and weight are swung or flung around within the feed hopper. The rotating action of the cable and weight provide sufficient stirring action to feed that is located adjacent to the cable to cause feed to fall into the hollow center of the feed then downward through the bottom opening of the hopper to the automated feed dispersing mechanism where it is dispensed.

It is important to create the hollow center in the feed hopper around the cable as the power mechanism that spins the member and the attached cable is generally not sufficient to turn them when the feed is tightly packed around the cable.

To fill the feed hopper and form the hollow center in the feed, the lid of the empty feed hopper is first removed to expose the open top of the feed hopper. A hollow fill tube is inserted over the cable within the feed hopper. Then feed is poured around the outside of the hollow tube via the open top of the feed hopper to fill the hopper with the powdered feed. Once the hopper is filled, the feed is preferably packed within the hopper by vibrating the hopper or by other suitable means. The hollow tube is then gently removed from the hopper. As the hollow tube is removed, the powdered feed tends to stay compressed so that a hollow center that is devoid of feed is created within the hopper and the cable remains within the hollow center of the feed.

DETAILED DESCRIPTION OF THE PREFERRED EMBODIMENT

Figure 1:
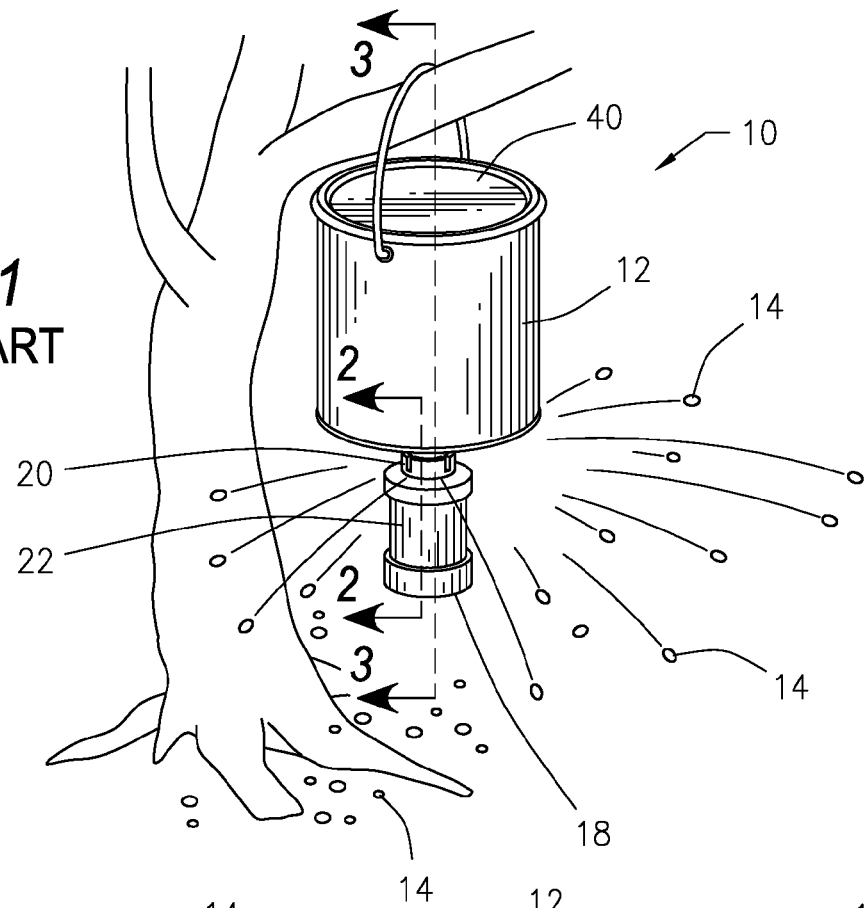
FIG. 1 is a prior art game feeder that is shown hanging on a tree and dispensing feed from the feeder to the ground.
Figure 2:
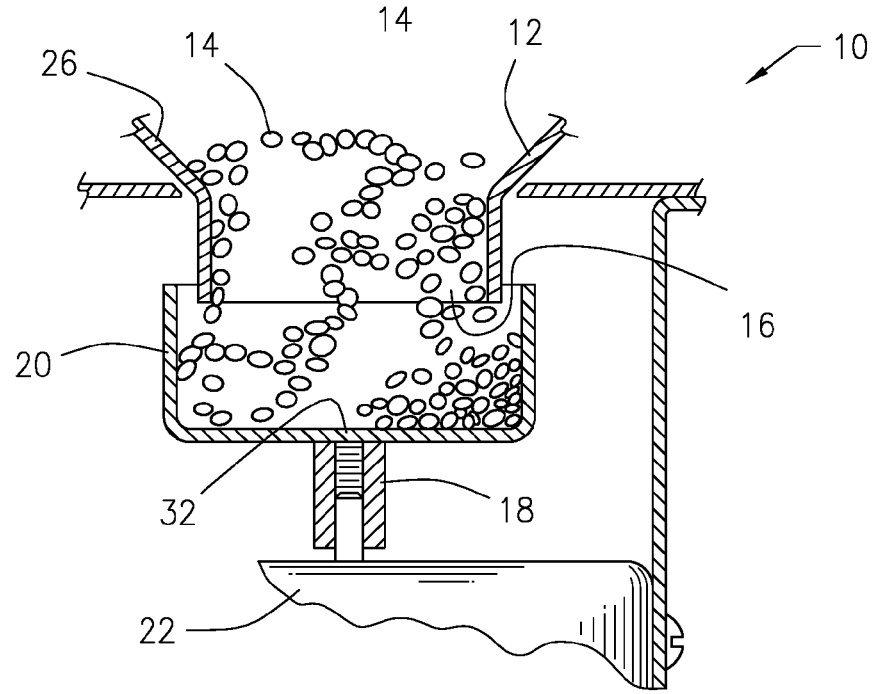
FIG. 2 is a cross sectional view of the feeder of FIG. 1 taken along line 2-2 showing the rotating member of the dispensing mechanism that rotates to dispense the feed.
Figure 3:
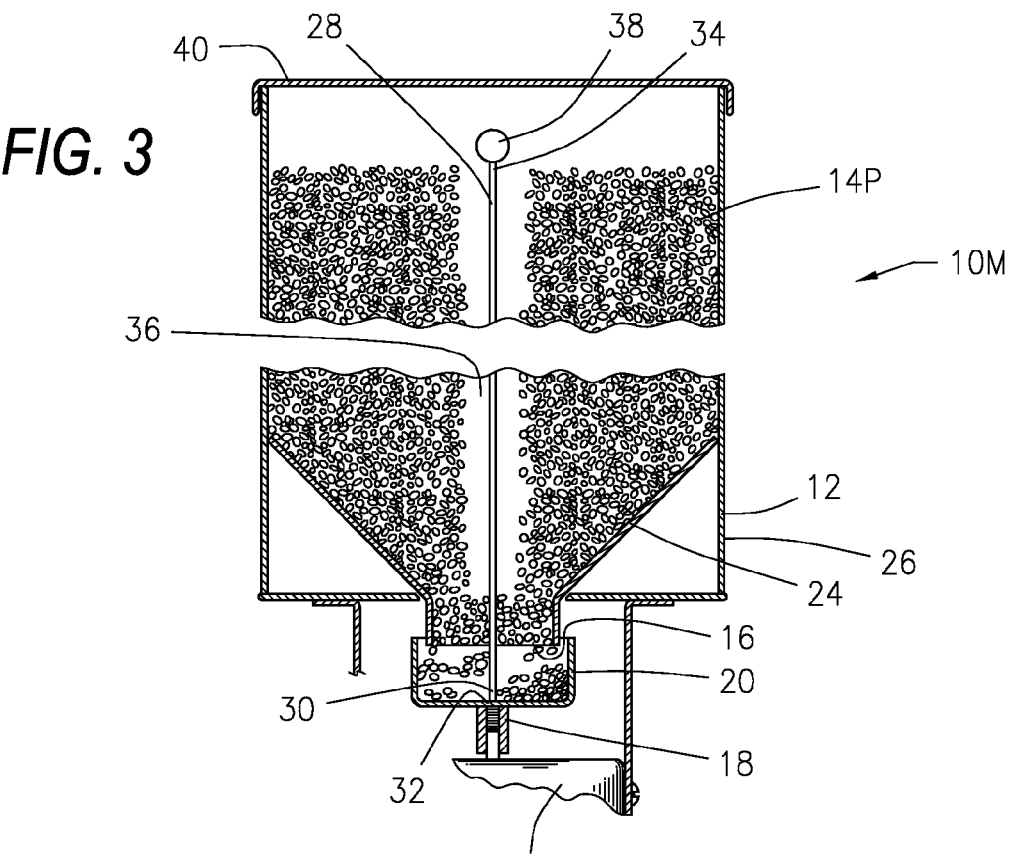
FIG. 3 is a partially cut-away cross sectional view of the feeder of FIG. 1 taken along line 3-3 that has been modified in accordance with a preferred embodiment of the present invention.

Referring to FIGS. 1 and 2, there is illustrated a prior art game feeder 10 that is capable of being modified to form a modified feeder 10M that is constructed in according to a preferred embodiment of the present invention as shown in FIG. 3.

As illustrated in FIGS. 1 and 2, an existing game feeder 10 generally is provided with a gravity feed hopper 12 for holding grain feed 14, a bottom opening 16 in the hopper 12, and a feed dispensing mechanism 18 located under and associated with the bottom opening 16 for periodically dispersing feed 14 from the hopper 12. The dispensing mechanism 18 generally has a rotating member 20 that receives the feed 14 from the bottom opening 16 and that rotates to fling the feed 14 out of the feeder 10. The dispensing mechanism 18 is also provided with a motor 22 that is generally battery driven and that periodically rotates or spins the rotating member 20. The dispensing mechanism 18 may also be provided with a timer (not illustrated) and a computer chip (not illustrated) to allow it to automatically dispense the feed 14 at predetermined intervals.

The hopper 12 for the feeder 10 or alternately an insert 24 provided within the hopper 12 may be in the shape of an inverted cone at the lower portion 26 of the hopper 12 so that the feed 14 located within the hopper 12 will gravity feed downward to the bottom opening 16, through the bottom opening 16 and onto the automated feed dispersing mechanism 18 that is located under the bottom opening 16. The rotating member 20 of the feed dispersing mechanism 18 spins or rotates to disperse feed 14 from the feeder 10 and prevents the feed 14 from being dispensed when the rotating member 20 is not spinning or rotating.

Although this type of game feeder 10 works well with grain feeds 14 such as kernels of corn, it is not suitable for use with powdered feeds 14P such as rice bran because powdered feeds 14P tend to accumulate moisture and cake up so that they do not feed properly from the feed hopper 12.

Referring now to FIG. 3, the present invention addresses this problem by providing a semi-flexible cable 28, such as a metal cable, that attaches by a first proximal end 30 of the cable 28 to the center 32 of the rotating member 20 of an existing feeder 10 to convert it into a modified feeder 10M of the present invention. The cable 28 extends upward through the feed hopper 12 so that the opposite terminal or distal end 34 of the cable 28 is located within a hollow center 36 of the feed 14P that is formed within the feed hopper 12 as the feed 14P is loaded into the feed hopper 12. The semi-flexible cable 28 preferably has a weight 38 attached at its terminal end 34 so that as the rotating member 20 spins, the cable 28 and weight 38 are swung or flung around within the feed hopper 12. The rotating action of the cable 28 and the weight 38 provide sufficient stirring action to the powdered feed 14P that is located adjacent to the cable 28 to cause feed 14P to fall into the hollow center 36 of the feed 14P, then downward through the bottom opening 16 of the hopper 12 to the automated feed dispersing mechanism 18 where it is dispensed.

It is important to create the hollow center 36 in the feed hopper 12 around the cable 28 as the motor 22 that spins the member 20 and the attached cable 28 and weight 38 is generally not sufficient to turn them when the feed 14P is tightly packed around the cable 28.

Figure 4:
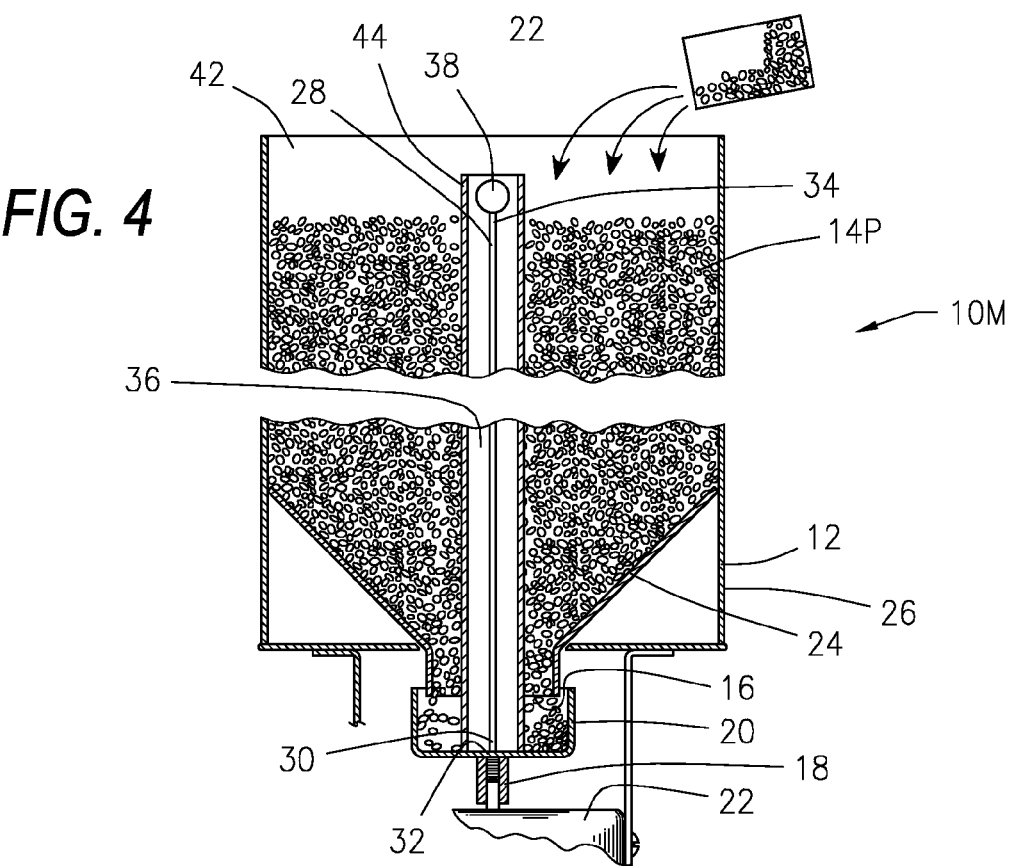
FIG. 4 is the feeder of FIG. 3 showing the lid removed from the feeder, the hollow fill tube inserted around the cable and powdered feed being poured into the hopper to fill it and create a hollow center in the feed surrounding the cable.

Referring to FIG. 4, to fill the feed hopper 12 and form the hollow center 36 in the feed 14P, the lid 40 of the empty feed hopper 12 is first removed to expose the open top 42 of the feed hopper 12. A hollow fill tube 44 is inserted over the cable 28 within the feed hopper 12. Then feed 14P is poured around the outside of the hollow tube 44 via the open top 42 of the feed hopper 12 to fill the hopper 12 with the powdered feed 14P. Once the hopper 12 is filled, the feed 14P is preferably packed within the hopper 12 by vibrating the hopper 12 or by other suitable means. The hollow tube 44 is then gently removed from the hopper 12. As the hollow tube 44 is removed, the powdered feed 14P tends to stay compressed so that a hollow center 36 that is devoid of feed 14P is created within the hopper 12 and the cable 28 remains within the hollow center 36 of the feed 14P.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A powdered bran feeder having a gravity feed hopper for holding grain feed, a lid removably covering a top opening of the hopper, a bottom opening provided in the hopper, a lower portion of the hopper having an effective shape of an inverted cone so that feed located with the hopper gravity moves downward to the bottom opening, and a feed dispensing mechanism located under and in association with the bottom opening for periodically dispersing feed from the hopper, a rotating member of said dispensing mechanism that receives feed that falls from the hopper via the bottom opening and that periodically spins to fling the feed out of the feeder and prevents feed from being dispersed from the feeder when the rotating member is not spinning, a battery driven motor attached to the rotating member as a means of periodically spinning the rotating member, a timer and a computer chip associated with said dispensing mechanism for activating the motor at preset time intervals, wherein the improvement comprises:

a semi-flexible cable having a first proximal end and an opposite free distal end, the first proximal end attached by a first proximal end to the rotating member so that the cable swings outward away from the center of the feed hopper as the cable spins in association with the rotating member, the distal end of the cable extending upward through the feed hopper into a hollow center of the feed that is formed within the feed hopper as the feed is loaded into the feed hopper, a weight attached at the free distal end of the cable so that the distal end of the cable and the weight are flung out of a hollow center of the feed within the feed hopper as the rotating member spins to provide sufficient stirring action to the powdered feed located adjacent to the cable to cause feed to fall into the hollow center of the feed and then downward through the bottom opening of the hopper to the automated feed dispersing mechanism below, and means for creating the hollow center of feed within the hopper as the hopper is filled with feed, wherein said means comprises a removable hollow fill tube which is not securable to any structure for removably inserting over the cable within the feed hopper prior to adding feed to the top of the feed hopper and which is then removed after the hopper is filled and packed with feed so as to leave the hollow center of feed within the hopper where the fill tube was removed.

\* \* \* \* \*